United States Patent [19]

Beck et al.

[11] Patent Number: 4,603,951
[45] Date of Patent: Aug. 5, 1986

[54] SPECTACLE FRAME WITH SECURING BAND

[75] Inventors: Rainer Beck, Oelde; Alfons Schülte, Beckum, both of Fed. Rep. of Germany

[73] Assignee: Eugen Beck, KG, Oelde, Fed. Rep. of Germany

[21] Appl. No.: 736,515

[22] Filed: May 20, 1985

Related U.S. Application Data

[63] Continuation of Ser. No. 419,588, Sep. 17, 1982, abandoned.

[30] Foreign Application Priority Data

Sep. 19, 1981 [DE] Fed. Rep. of Germany ... 8127522[U]
Feb. 6, 1982 [DE] Fed. Rep. of Germany ... 8203188[U]

[51] Int. Cl.$^4$ ................................................ G02C 2/00
[52] U.S. Cl. .................................... 351/156; 351/123; 351/157
[58] Field of Search ............... 351/123, 150, 155, 156, 351/157, 158

[56] References Cited

U.S. PATENT DOCUMENTS 2,023,523 12/1935 Grimball .............................. 351/155
3,582,194 6/1971 Liautaud .............................. 351/156

Primary Examiner—Rodney B. Bovernick
Assistant Examiner—P. M. Dzierzynski
Attorney, Agent, or Firm—Herbert L. Lerner; Laurence A. Greenberg

[57] ABSTRACT

Spectacle frame with a removable elastic securing band which attaches to the temples of the frame. Each of the two temples of the spectacle frame has a hole in the vicinity of the temple end on the ear side, of which at least one extends substantially in the longitudinal direction of the temple. The securing band, realized as an elastic cord, has at least at one end an end enlargment. The securing band is brought through the holes, where the enlarged end bears against the hole end of the hole of the first temple and the securing band is brought through the hole, extending essentially in the longitudinal direction of the temple, of the second temple in a self-locking manner.

7 Claims, 10 Drawing Figures

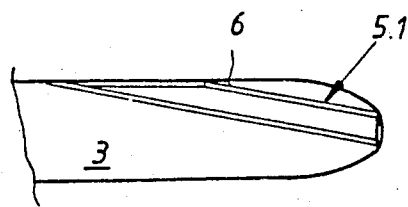
Fig. 3
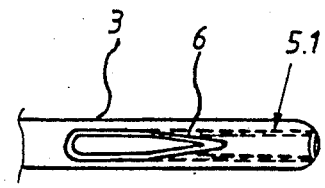
Fig. 4
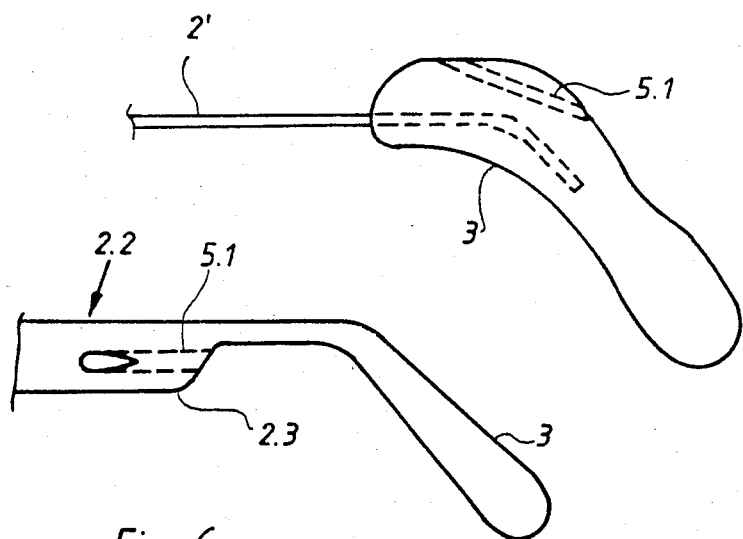
Fig. 5
Fig. 6

SPECTACLE FRAME WITH SECURING BAND

This application is a continuation of application Ser. No. 419,588 filed Sept. 17, 1982, now abandoned.

BACKGROUND OF THE INVENTION

1. Field of the Invention

The invention relates to a spectacle frame with a removable elastic securing band which engages the temples of the frame.

2. Description of the Prior Art

On many occasions, wearing glasses calls for securing the glasses. This is particularly important in the case of athletes who are exposed to shocks when practicing their sport. Spectacles can come loose or get lost if they have been deformed in the course of being worn and no longer fit properly. For a sailor or surfer whose glasses were lost, for instance, by hitting a wave hard and were washed overboard, this means considerable danger unless he can fall back on a pair of spare glasses, since the vision correction necessary for him is no longer there or, in the case of sun glasses, blinding occurs. The same applies to mountain climbers and horseback riders or to other sportsmen who, like for instance, tennis players exert violent body motions when practicing their sport. To a perhaps lesser degree, somewhat similar strong body motions naturally occur to playing children. In addition, sliding spectacles can adversely affect the professional activity of a spectacle wearer if it is necessary for him to see fine details in his activities. Typical of this is a surgeon who works beside the operating table in bent-over position: pushing back slipping glasses can result in serious damage to the patient. Glasses which become loose or drop off would, in addition, also mean a further danger of infection for the patient. Furthermore, slipping glasses which must always be pushed back into their correct position are a nuisance and a handicap in other activities.

It is known to use spectacle securing bands which engage at the temples of the spectacle frame to prevent slipping or loosening of spectacles. Loops are placed about the temples and the securing band is stretched about the rear of the head. A length adjustment of the securing band is provided here. According to another design, half-moon-shaped sliding shoes provided with a slot are placed on the temples of the spectacle frame, the securing band being tightened from sliding shoe to sliding shoe about the rear part of the heat. The length is compensated by moving the sliding shoes. Neither of these two securing devices can be attached at the spectacle frame inconspicuously. In addition, the loops or the push-on shoes are not always located firmly on the temples, and spontaneous loosening may be the result. Also the loops of the slip-on shoes may rest on the skin and lead to discomfort due to pressure and/or abrasion marks.

SUMMARY OF THE INVENTION

An object of the invention is to provide a spectacle frame to which a securing band can be fastened and securely fixed to the spectacle frame in a simple manner, and which spectacle frame can be prepared in a simple manner for receiving the securing band, such that the glasses with the spectacle frame can be worn loosely as well as firmly, and the securing band and its fastening means are fastened to the temples of the spectacle frame inconspicuously and in an aesthetically satisfactory manner.

With the foregoing and other objects in view, there is provided in accordance with the invention a spectacle frame having two temples designated a first temple and a second temple, with a removable elastic securing band which attaches to the temples of the frame, the combination therewith of a hole in each of the two temples of the spectacle frame in the vicinity of the temple end on the ear side, with at least one hole extending substantially in the longitudinal direction of the temple; an elastic securing band with at least at one end having an end enlargement; and the securing band brought through the holes, with said enlarged end of the securing band bearing against the hole end of the hole of the first temple, and the securing band brought through the hole of the second temple in a self-locking manner, said hole of the second temple extending essentially in the longitudinal direction of the temple.

Other features which are considered as characteristic for the invention are set forth in the appended claims.

Although the invention is illustrated and described herein as embodied in a spectacle frame with securing band, it is nevertheless not intended to be limited to the details shown, since various modifications may be made therein without departing from the spirit of the invention and within the scope and range of equivalents of the claims.

BRIEF DESCRIPTION OF THE DRAWINGS

The invention, however, together with additional objects and advantages thereof will be best understood from the following description when read in connection with the accompanying drawings, in which:

FIG. 3 illustrates the end section of an ear piece with an oblique hole, FIG. 4 is a top view onto the end section of the ear piece according to FIG. 3, FIG. 5 shows another embodiment which has an oblique hole at the ear piece of spectacles with metal temples, the hole facing away from the end on the ear side, FIG. 6 illustrates an oblique hole at the end on the ear side of the reinforcement of a temple.

DETAILED DESCRIPTION OF THE INVENTION

Figure 1:
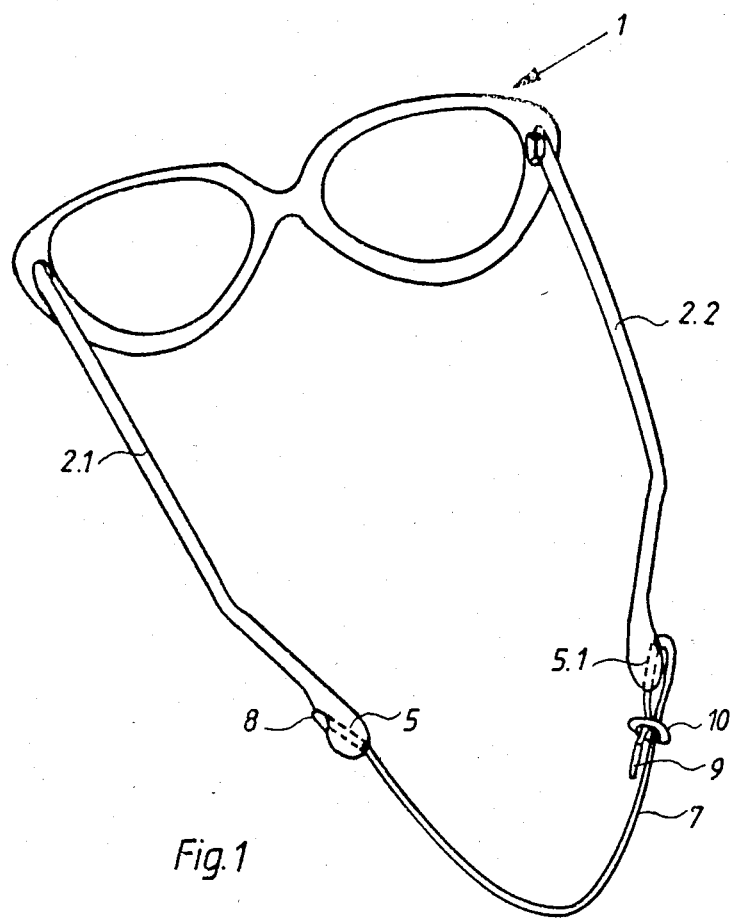
FIG. 1 is a perspective view illustrating a spectacle frame with a securing band in accordance with the invention, FIG. 2 diagrammatically shows the ear-side end of a temple of the spectacle frame with an oblique hole through which one end of the securing band passes.

According to the invention, each of the two temples of the spectacle frame has a hole in the vicinity of the temple end on the ear side, of which at least one hole extends substantially in the longitudinal direction of the temple. The securing band, an elastic cord, has an end reinforcement at least at one end. The securing band is brought through the holes, where the end reinforcement is braced against the hole end of the hole of the first temple and the securing band is brought in a self-locking manner through the hole of the second temple which extends substantially in the longitudinal direction of the temple. In a further embodiment, the exit opening of the hole in the first temple has a countersink accepting the end enlargement of the securing band. Through this embodiment, a surprisingly simple solution to overcoming prior difficulties is obtained: The temples which are provided with holes in the vicinity of the temple ends on the ear side are connected by the securing band which is brought through the holes and is tightened around the rear part of the head. The securing band is fixed at the one temple by the end enlargement while the other end of the securing band is brought through the second hole in a self-locking manner. The length of the band can be adjusted in a simple manner by pulling the securing band through to obtain a desired tautness. Holding elements which are bulky or are pushed over the temple, such as loops or push-on shoes are not employed. The securing band which is brought through the holes as an elastic cord is inconspicuous and for all practical purposes does not disturb the appearance of the spectacle wearer. Through use of the countersink in the exit opening of the hole of the first temple, the end enlargement may lie almost flush with the surface of the temple bearing against the wall of the countersink but without bearing against the wearer of the spectacles.

An embodiment of the spectacle frame is characterized by the feature that the drill hole which extends substantially in the longitudinal direction of the temple is an oblique hole in the ear end of the temple with a drilling axis extending at an angle to the exit surface. Through this design of the hole as an oblique drill hole, a self-locking arrangement of the securing band is obtained by the fact that the securing band, arranged in V-fashion, is locked in the acute angle of the exit hole if tension is applied.

Another embodiment is characterized by the feature that the hole extending substantially in the longitudinal direction of the temple is in the vicinity of the temple reinforcement ending on the ear side as an oblique drill hole with a drilling axis extending at an angle to the exit surface.

The securing band, through this position of the oblique hole, is arranged as a quasi extension of the stretched-out temple parts around the rear part of the head. The pull exerted on the temples of the spectacle frame then acts in a longitudinal direction.

With regard to the oblique hole, it is advantageous to have the opening of the oblique hole in the second temple, cut at an angle to the drill hole axis, made approximately in the shape of a tear drop, the tip of the drop pointing toward the temple end on the ear side. This design of the opening of the oblique hole has been found to be particularly secure with respect to the self-locking clamping effect. The cord-like securing band brought around the tip of the V is pulled into the tear drop tip which acts as a clamping notch and is held there securely. The oblique hole is desirably provided with a sleeve, and preferably with a metallic sleeve. This further embodiment of the invention is aimed at the dimensional stability of the tear-drop shape of the opening of the oblique hole. The introduction of a sleeve, preferably a metal sleeve, reinforces the wall of the temple which by itself is weakened by the hole and increases the stability accordingly. In addition, the action clamping the securing band is enhanced by the sharper edge of the inserted sleeve. This enhanced clamping effect is particularly effective if a metal sleeve is used.

A preferred embodiment is characterized by the feature that each of the two temples of the spectacle frame has in the vicinity of the ends toward the ears, a projection arranged on the lateral surface of the temple ear end. The projection is provided with the hole, of which the end facing the spectacle frame cooperates with the securing band in the clamping effect. The projection may be the head of a rivet, screw or the like set into the ear part of each temple. With this design of the temple it is possible to obtain the projection at the temple with a single opening for receiving the rivet, screw or the like. Also, the projection is prefabricated prior to insertion in the temple to provide for the hole necessary for passing-through the securing band. The orientation of the hole in an axis direction extending substantially in the longitudinal direction of the temple is accomplished during the insertion.

In addition, the rim, cooperating with the securing band, of the hole receiving the securing band has an approximately V-shaped cross section. As an alternative thereto the hole rim which cooperates with the securing band in a clamping relationship, of the hole receiving the securing band has the shape of a keyhole. The surface of the projection inserted into the temple is designed as a decorative bevel.

The formation of the hole rim for the hole receiving the securing band in the projection to be inserted into temples can likeeise be prefabricated in a simple manner. Thereby, the hole receiving the securing band is made separately and independently of the fabrication of the tubular temple. The inserted projection then contains the hole receiving the securing band with the rim design fixing the securing band in a locked position.

The ornamental design of the insert takes into account fashion aspects by obtaining a decorative effect by means of a suitable design of the surface of the insert.

With regard to the securing band, a tip stiffening the free end of the securing band may be provided. The replaceability of the securing band, which is basically already provided for by the fact that the securing band is equipped with an end reinforcement on only one side, is substantially improved by the use of the stiffened tip for threading-in the securing band as a cord. Such a stiffening is obtained for instance, simply by impregnating the end region of the securing band with plastic.

The stiffening tip may be designed as a ferrule extending beyond the end of the securing band, and especially as a metallic clamping ferrule. Putting such a ferrule on one end of the securing band provides a means to stiffen its tip. If plastic sleeves are used, it is possible, for instance, to shrink these sleeves on or to fasten them on the end of the securing band beyond which they extend, by thermal fixation. Metallic ferrules can advantageously be employed for this purpose because they can be clamped economically on the end of the securing band.

In addition, a loop which accepts the free end of the securing band may be utilized. This loop is advantageous if the length of the securing band is intended for considerable variations of the length. This is the case if the glasses are to be worn loose and tight. In the loose position of the securing band, the glasses can also be hung around the neck; fixing the free end of the securing band by the loop always forces the self-clamping hold.

A particular embodiment is characterized by the feature that the loop is arranged on the part of the securing band which extends between the two temples. Another embodiment is characterized by the feature that the loop on the second temple is arranged on the side of the oblique hole facing away from the temple end on the ear side. Both embodiments are alternative; the first embodiment is preferred if the oblique hole brings about a clamping effect in such a form that the section of the securing band which points substantially toward the ear end is clamped; the free and loose end is then pulled by means of the loop toward the part of the securing band which is looped around the rear part of the head.

FIGS. 1 to 9 describe the nature of the invention by way of examples.

In detail, FIG. 1 shows the spectacles frame 1 with the setting part for both lenses as well as the temples 2.1 and 2.2. The temples, sometimes called hinged bows, constitute parts of the frame and extend along the temples of the person wearing the spectacles (hence their name). Usually the temples pass over or around the ears. Both temples are connected to each other by the securing band 7 which encloses the rear part of the head in the operating position. This securing band 7 is brought in the first temple 2.1 through a first hole 5. Securing end 7 has an enlarged end 8 which rests against the outer end of hole 5. The outer end of the hole can be formed corresponding to the enlarged end 8, for instance, by a countersink, so that the enlarged end is laid flush with the surface of the temple 2.1. Force or pull on the securing band 7 is transmitted to the enlarged end 8 which in turn braces itself against the temple 2.1. Thus, direct pressure contact of enlarged end 8 with the skin of the spectacle wearer is avoided. The second temple 2.2 is provided with a second hole 5.1, through which the second end 9 of the securing band 7 is brought in a self-locking manner. It is advantageous if hole 5.1 which extends substantially in the longitudinal direction of the temple, is brought into the temple 2.2 at an angle, so that the securing band must be laid-on under tension, self-locking, at the exit angle of the hole 5.1. The free end 9 of the securing band is held by the loop 10.

Figure 2:
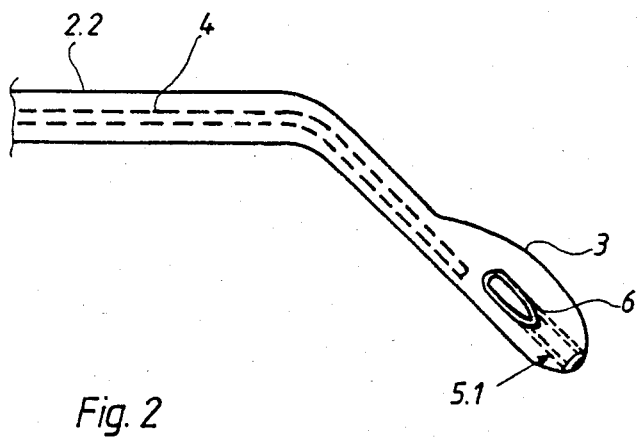

FIG. 2 shows the ear-side end of the temple 2.2 with the metal reinforcement 4. The longitudinal hole 5.1 which extends substantially in the longitudinal direction of the temple bent toward the ear piece 3 is lined with a sleeve 6. The sleeve penetrating the temple wall is cut at an angle corresponding to the exit angle and has the shape of a tear drop. The end of the securing band which is under tension is arranged in accordance with FIG. 1 and, with this design of the hole opening, is pulled into the "tip of the drop" acting as the clamping notch.

FIG. 3 shows a cross section through the ear end 3 with the oblique hole 5.1 and the inserted sleeve 6. FIG. 4 shows a top view onto the same ear end 3. Due to the vary small angle between the longitudinal axis of the ear piece 3 and the hole axis of the oblique hole 5.1, the exit opening of the oblique hole is enlarged considerably; thus, there is sufficient room for clamping the securing band in the form of an elastic cord.

FIG. 5 shows an embodiment at the ear piece 3 of metal temple spectacles in which the metal temple is designated 2'. The oblique hole 5.1 is in the part of the ear piece 3 which faces away from the ear side end. Thereby, the pull is exerted approximately at the height and in the direction of the temple. With this arrangement, an advantageous force distribution is achieved.

FIG. 6 shows a section of the temple 2.2 with an end 3 at the ear side, in which the temple reinforcement 2.3 is utilized for receiving the oblique hole 5.1. In this arrangement, the oblique hole lies directly in the direction of the temple. The attacking forces which act in this direction, are thus transmitted to the spectacle frame particularly well.

It goes without saying that the hole 5 in the first temple 2.1 for receiving the enlarged end 8 is advantageously arranged similarly to the hole 5.1 in the temple 2.2. In this arrangement, the force attack points are symmetrical to the nose bridge, so that the forces which occur cannot be the cause of unintended sliding of the glasses.

Figure 7:
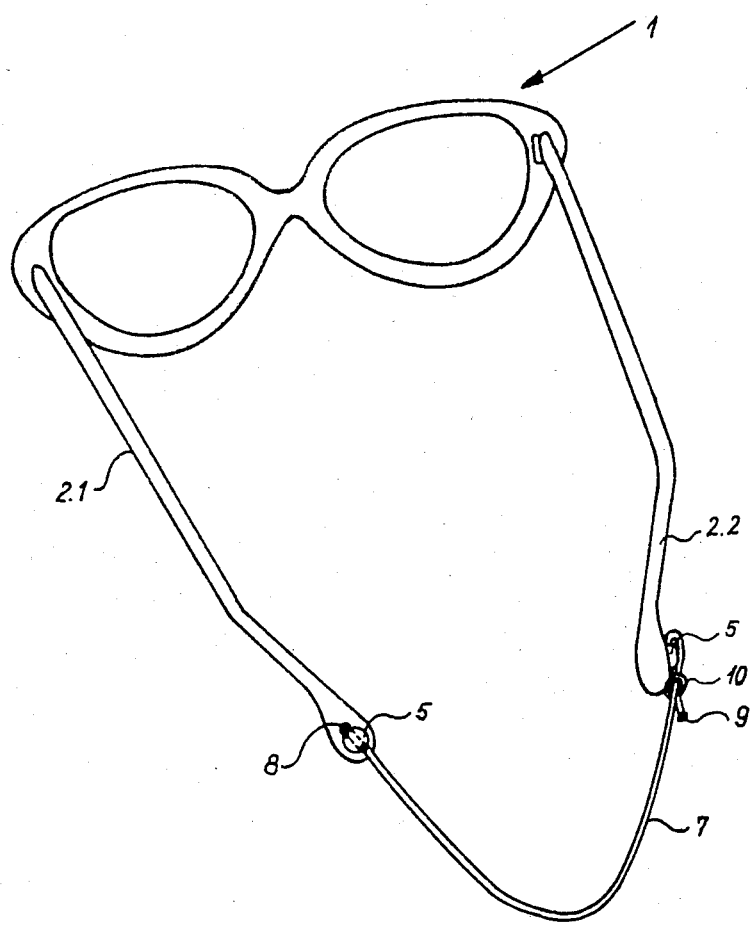
FIG. 7 illustrates a spectacle frame with a securing band brought through inserted projections on the temples.
Figure 8A:
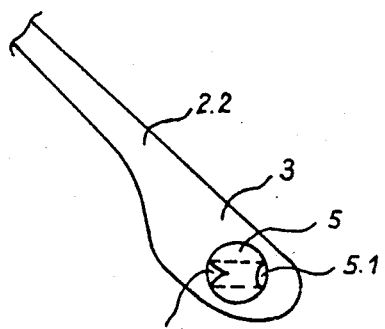
FIG. 8a shows the design of the clamping edge of the hole in the projection as a triangle.
Figure 8B:
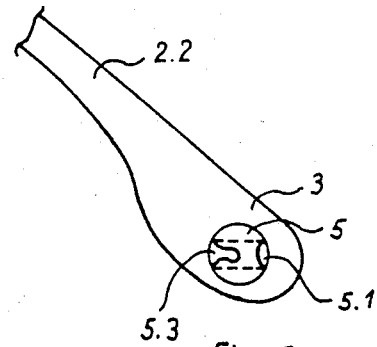
FIG. 8b shows the design of the clamping edge as a keyhole.
Figure 9:
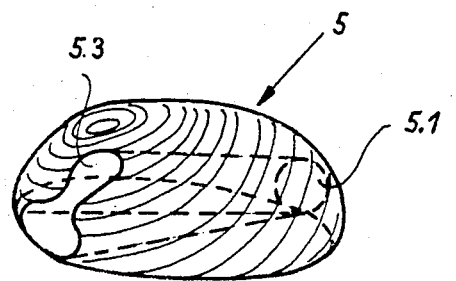
FIG. 9 is the projection of FIG. 8b in enlarged form.

In detail, FIG. 7 shows the spectacle frame 1 with the two temples 2.1 and 2.2, where each temple has a projection 5" which is provided with the hole 5.1 (FIG. 8). The securing band 7 is fixed on the one side by the head 8; on the other side, it is brought from the ear end through the hole 5.1 in the projection 5", is bent over and is finally held by the loop 10. The clamping takes place on this side. FIG. 8a shows the clamping edge of hole 5.1 in the form of a triangle 5.2. In FIG. 8b the clamping edge is in the form of a keyhole 5.3. FIG. 9 is an enlargement of projection 5", hole 5.1 and keyhole 5.3 to give a three-dimensional concept of the projection and hole.

We claim:

1. Spectacle frame having a removable elastic safety band attached to temples of the frame designated a first temple and a second temple, fastening means for the safety band in the form of an elastic string at the end region near the ear of each of the two temples, a single elongated hole with an inlet opening and an exit opening in each temple in which hole the exit opening is, at least in the second temple, of drop-shaped configuration, said exit opening having a longitudinal axis extending approximately parallel to the temple and a pointing end directed towards the ear end of the temple, said safety band having a free end guided through the hole forming essentially an U-shaped loop running toward the ear end of the temple with the vertex of the U located in the tip of the exit opening, whereby pulling of the free end of the loop toward the ear end of the temple clamps the vertex of the U in said pointing end of the exit opening, and pulling of the free end of the loop in a direction away from the ear end unclamps the vertex of the U permitting adjustment of the length of the safety band.

2. Spectacle frame having a removable elastic safety band attached to temples of the frame designated a first temple and a second temple, fastening means for the safety band in the form of an elastic string at the end region near the ear of each of the two temples, a single elongated hole provided with a sleeve having an inlet opening and an exit opening in each temple in which hole the exit opening is, at least in the second temple, of drop-shaped configuration, said exit opening having a longitudinal axis extending approximately parallel to the temple and a pointing end directed towards the ear end of the temple, said safety band having a free end guided through the hole forming essentially an U-shaped loop running toward the ear end of the temple with the vertex of the U located in the tip of the exit opening, whereby pulling of the free end of the loop toward the ear end of the temple clamps the vertex of the U in said pointing end of the exit opening, and pulling of the free end of the loop in a direction away from the ear end unclamps the vertex of the U permitting adjustment of the length of the safety band.

3. Spectacle frame according to claim 2 wherein the sleeve is made of metal.

4. Spectacle frame having a removable elastic safety band attached to temples of the frame designated a first temple and a second temple, fastening means for the safety band in the form of an elastic string at the end region near the ear of each of the two temples, a projection on each of the two temples of the spectacle frame arranged on the outer side surfaces in the region of the ear tab of the temples, a single elongated hole with an inlet opening and an exit opening in each projection in which hole the exit opening is, at least in the second temple, of drop-shaped configuration with a pointing end of the exit opening directed towards the ear end of the temple, said exit opening interacting with the safety band to clamp the band, said safety band having a free end guided through the hole forming essentially an U-shaped loop running toward the ear end of the temple with the vertex of the U located in the tip of the exit opening, whereby pulling of the free end of the loop toward the ear end of the temple clamps the vertex of the U in said pointing end of the exit opening, and pulling of the free end of the loop in a direction away from the ear end unclamps the vertex of the U permitting adjustment of the length of the safety band.

5. Spectacle frame having a removable elastic safety band attached to temples of the frame designated a first temple and a second temple, fastening means for the safety band in the form of an elastic string at the end region near the ear of each of the two temples, a projection on each of the two temples of the spectacle frame arranged on the outer side surface in the region of the ear tab of the temples, a single elongated hole provided with a sleeve with an inlet opening and an exit opening in each projection in which hole the exit opening is, at least in the second temple, of drop-shaped configuration with a pointing end of the exit opening directed towards the ear end of the temple, said exit opening interacting with the safety band to clamp the band, said safety band having a free end guided through the hole forming essentially an U-shaped loop running toward the ear end of the temple with the vertex of the U located in the tip of the exit opening, whereby pulling of the free end of the loop toward the ear end of the temple clamps the vertex of the U in said pointing end of the exit opening, and pulling of the free end of the loop in a direction away from the ear end unclamps the vertex of the U permitting adjustment of the length of the safety band.

6. Spectacle frame according to claim 4, wherein the projection is shaped like the head of a rivet, and one said projection is attached to the ear tab end of each temple.

7. Spectacle frame according to claim 5, wherein the projection is shaped like the head of a rivet, and one said projection is attached to the ear tab end of each temple.

* * * * *